(12) United States Patent
Tanaka et al.

(10) Patent No.: US 7,610,144 B2
(45) Date of Patent: Oct. 27, 2009

(54) NAVIGATION APPARATUS AND PROCESSING METHOD OF THE SAME

(75) Inventors: Katsuaki Tanaka, Kanagawa (JP);
Yoshibumi Fukuda, Ibaraki (JP);
Yoshitaka Atarashi, Kanagawa (JP);
Tadashi Kamiwaki, Ibaraki (JP)

(73) Assignee: Xanavi Informatics Corporation, Zama-shi (JP)

( * ) Notice: Subject to any disclaimer, the term of this patent is extended or adjusted under 35 U.S.C. 154(b) by 511 days.

(21) Appl. No.: 11/396,631

(22) Filed: Apr. 4, 2006

(65) Prior Publication Data
US 2006/0271276 A1    Nov. 30, 2006

(30) Foreign Application Priority Data
Apr. 4, 2005    (JP)    ............... 2005-107608

(51) Int. Cl.
*G01C 21/00*    (2006.01)
(52) U.S. Cl. ..................................... 701/200
(58) Field of Classification Search ........................ None
See application file for complete search history.

(56) References Cited

U.S. PATENT DOCUMENTS

| | | | | |
|---|---|---|---|---|
| 5,949,345 A * | 9/1999 | Beckert et al. | ......... | 340/815.41 |
| 2002/0023223 A1 * | 2/2002 | Schmidt et al. | ............. | 713/187 |
| 2002/0120856 A1 * | 8/2002 | Schmidt et al. | ............. | 713/193 |
| 2003/0225485 A1 | 12/2003 | Fritz et al. | | |
| 2005/0055154 A1 | 3/2005 | Tanaka et al. | | |

FOREIGN PATENT DOCUMENTS

| | | |
|---|---|---|
| DE | 4218804 A1 | 12/1993 |
| JP | 6-99778 A | 4/1994 |
| JP | 2003-222523 A | 8/2003 |

* cited by examiner

*Primary Examiner*—Michael J. Zanelli
(74) *Attorney, Agent, or Firm*—Crowell & Moring LLP

(57) ABSTRACT

A navigation apparatus includes a receiving section for receiving program via a communication unit, a driving determining section for determining whether a vehicle equipped with the navigation apparatus is running or not if receiving a start request for the program, and an execution control section for activating the program if it is determined that the vehicle is running by the driving determining section and also if the program received by the receiving section is authorized. The executing control section cancels executing the program if it is determined that the vehicle is running by the driving determining section and also if the program received by the receiving section is not authorized.

12 Claims, 11 Drawing Sheets

FIG. 3

PROGRAM MANAGEMENT TABLE 122

| PROGRAM NAME | FILE NAME | AUTHENTICATION INFORMATION | WARNING INFORMATION |
|---|---|---|---|
| WEB BROWSER | Browser. xxx | AUTHORIZED | |
| NEARBY SHOP INFORMATION | Nearbypoi. xxx | AUTHORIZED | |
| TRAFFIC INFORMATION | Traffic. xxx | MONITORING | |
| MASCOT | mascot. xxx | UNAUTHORIZED | 04/11/11 20:20 |

NAVIGATION APPARATUS AND PROCESSING METHOD OF THE SAME

CROSS-REFERENCE TO RELATED APPLICATION

This application claims the benefit of Japanese Patent Application No. 2005-107608 filed on Apr. 4, 2005, the disclosure of which is incorporated herein by reference.

FIELD OF THE INVENTION

The present invention relates to a navigation apparatus, particularly to an in-car navigation apparatus, and a processing method of the in-car navigation apparatus.

DESCRIPTION OF THE RELATED ART

Some of in-car navigation apparatuses receive external programs (application software) via radio communication, and install the programs on the system to execute them. These external programs sometimes include such programs that occupy a screen and hinder navigation operation during vehicle driving, or that consume so much memory of the system that operations of other programs are hindered.

In the light of the above problem, on-vehicle equipment is disclosed in JP-A-2003-222523, which prohibits external programs additionally installed from being executed during vehicle driving.

However, at the same time, such on-vehicle equipment even prohibits other additionally installed programs which are not malicious and do not hinder the operation of the in-car navigation apparatus, which causes inconvenience.

To overcome the above-mentioned disadvantage, the present invention provides an in-car navigation apparatus activating programs that have been additionally installed while securing the operation of the in-car navigation apparatus.

SUMMARY OF THE INVENTION

In one aspect, the present invention provides a navigation apparatus that comprises a receiving section for receiving program via a communication unit, a driving determining section for determining whether a vehicle equipped with the navigation apparatus is running or not when receiving a start request for the program, and an execution control section for activating the program if it is determined that the vehicle is running by the driving determining section and also if the program received by the receiving section is authorized. The executing control section further cancels executing the program if it is determined that the vehicle is running by the driving determining section and also if the program received by the receiving section is not authorized. The execution control section further determines that the program is authorized if the program is attached with information indicating being authorized, and determines that the program is not authorized if the program is attached with no information indicating being authorized.

In another aspect, the present invention provides a navigation apparatus that comprises a receiving section for receiving program via a communication unit, a monitoring section for monitoring whether or not there is any predetermined unauthorized device access during executing the program received by the receiving section, and an execution control section for canceling executing the program if it is determined that there is any predetermined unauthorized device access by the monitoring section.

In another aspect, the present invention provides a navigation apparatus that comprises a receiving section for receiving program via a communication unit, a monitoring section for monitoring whether or not there is any predetermined unauthorized device access during executing the program received by the receiving section, and an authorizing section for authorizing the program if it is determined that there has been no predetermined unauthorized device access in a predetermined time period by the monitoring section. The navigation apparatus according to this aspect of the present invention further comprises a displaying section for displaying information of whether the program is authorized or not.

In another aspect, the present invention provides a navigation apparatus that comprises a downloading section for downloading program via a communication unit, a driving determining section for determining whether or not a vehicle equipped with the navigation apparatus is running if an execution request for the program is received, an electronic signature determining section for determining whether or not the program is attached with an electronic signature if it is determined that the vehicle is running by the driving determining section, a program activating section for activating the program if it is determined that the program is attached with the electronic signature by the electronic signature determining section, a device access determining section for activating the program and determining whether or not there is any predetermined unauthorized device access during executing the program if it is determined that the program is attached with no electronic signature, a selection receiving section for outputting warning and receiving a selection of whether execution of the program should be canceled or not if there is any predetermined unauthorized device access, and an execution selecting section for canceling the execution of the program if it is selected that the execution of the program should be canceled, or maintaining the execution of the program if it is selected that the execution of the program should not be canceled.

The predetermined unauthorized device access includes occupation of receipt of input from an input device, occupation of a display screen, occupation of receipt of speech input, speech output with a large volume, data communication to external, acquisition/manipulation of vehicle information (vehicle location, etc) acquisition of destination information, manipulation of rout information, and occupation of memory.

In another aspect, the present invention provides a processing method of a navigation apparatus that comprises a receiving step of receiving program via a communication unit, a driving determining step of determining whether or not a vehicle equipped with the navigation apparatus is running if a start request for the program is received, an execution control step of activating the program if it is determined that the vehicle is running at the driving determining step and also if the program received at the receiving step is authorized. The execution control step further cancels executing the program if it is determined that the vehicle is running at the driving determining step and also if the program received at the receiving step is not authorized.

In another aspect, the present invention provides a processing method of a navigation apparatus that comprises a receiving step of receiving program via a communication unit, a monitoring step of determining whether or not there is any predetermined unauthorized device access during executing the program received at the receiving step, and an execution control step of canceling executing the program if it is determined that there is any predetermined unauthorized device access at the monitoring step.

In another aspect, the present invention provides a processing method of a navigation apparatus that comprises a receiving step of receiving program via a communication unit, a monitoring step of determining whether or not there is any predetermined unauthorized device access during executing the program received at the receiving step, an authorizing step of authorizing the program if it is determined that there has been no predetermined unauthorized device access in a predetermined time period at the monitoring step.

In another aspect, the present invention provides a processing method of a navigation apparatus that comprises a downloading step of downloading program via a communication unit, a driving determining step of determining whether or not a vehicle equipped with the navigation apparatus is running if an execution request for the program is received, a signature determining step of determining whether or not the program is attached with an electronic signature if it is determined that the vehicle is running at the driving determining step, an activating step of activating the program if it is determined that the program is attached with an electronic signature, a device access determining step of activating the program and determining whether or not there is any predetermined unauthorized device access during executing the program if it is determined that the program is attached with no electronic signature, a selection receiving step of outputting warning and receiving a selection of whether execution of the program should be canceled or not if there is any predetermined unauthorized device access and an execution selecting step of canceling the execution of the program if it is selected that the execution of the program should be canceled, or maintaining the execution of the program if it is selected that the execution of the program should not be canceled.

Other features and advantages of the present invention will become more apparent from the following detailed description of the invention. When taken in conjunction with the accompanying exemplary drawings.

BRIEF DESCRIPTION OF THE DRAWINGS

FIG. 3 shows a program management table 122.

DETAILED DESCRIPTION OF THE PREFERRED EMBODIMENTS

Explanations will be provided on an embodiment according to the present invention.

Figure 1:
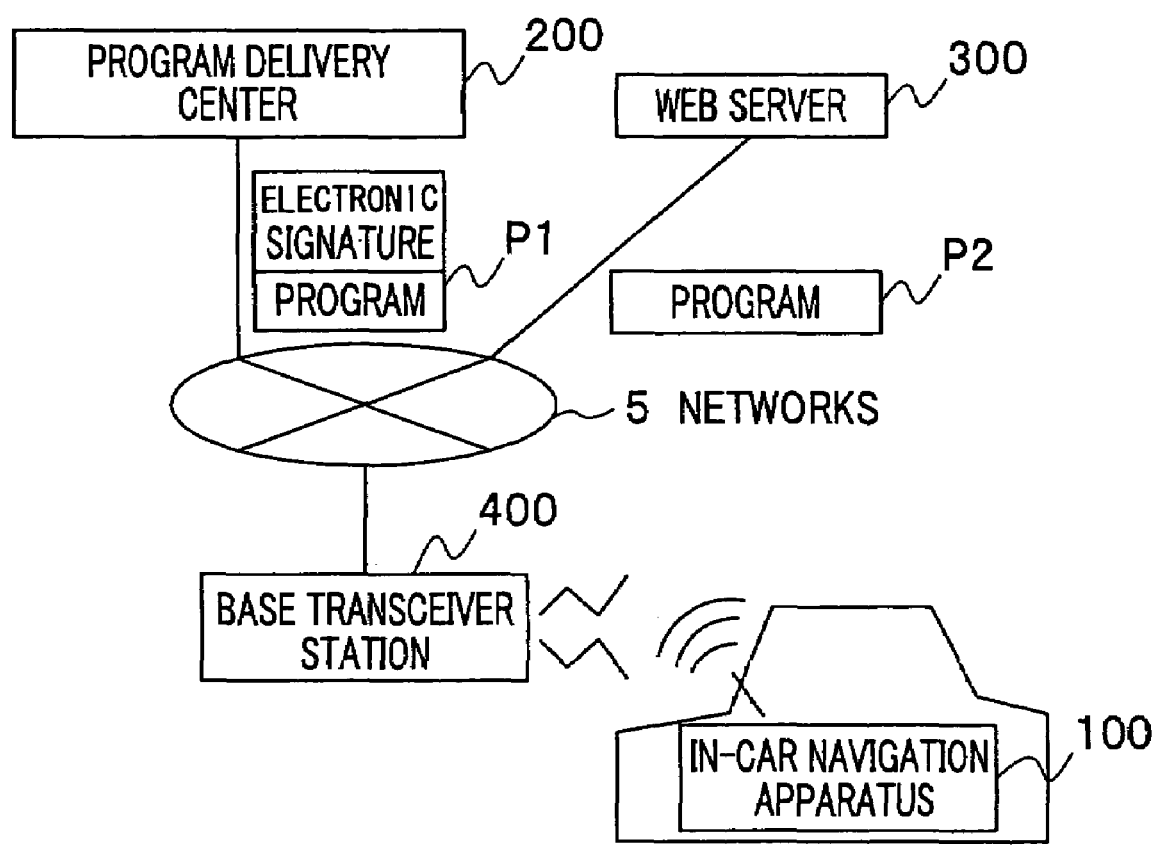
FIG. 1 is a schematic diagram of an in-car navigation system according to an embodiment of the present invention.

FIG. 1 is a schematic diagram of an in-car navigation system according to the present embodiment. As shown in FIG. 1, the in-car navigation system comprises an in-car navigation apparatus 100, a program-delivery center 200, a Web server 300 and a base transceiver station 400. The program-delivery center 200, the Web server 300 and base transceiver station 400 are connected with each other via networks 5 such as the Internet.

The in-car navigation apparatus 100 provides radio communication to the base transceiver station 400, and connects to the program-delivery center 200 and the Web server 300 via the base transceiver station 400.

The program-delivery center 200 stores on a memory device thereof programs P1 that are authorized is attached with an electronic-signature by a certificate authority (not shown). The program-delivery center 200 downloads the program P1 onto the in-car navigation apparatus 100 in accordance with a download request from the in-car navigation apparatus 100. The certificate authority validates that a program provided by a program provider does not hinder operation of the in-car navigation apparatus 100, and then adds to the program an electronic signature indicating that the program is authorized.

The Web server 300 stores programs P2 that are not authorized on a memory device thereof. The Web server 300 downloads the program P2 onto the in-car navigation apparatus 100 in accordance with a download request from the in-car navigation apparatus 100.

The program-delivery center 200 and the Web server 300 can be implemented by use of a conventional computer system such as a personal computer and a workstation including CPU, memory and HDD.

Figure 2:
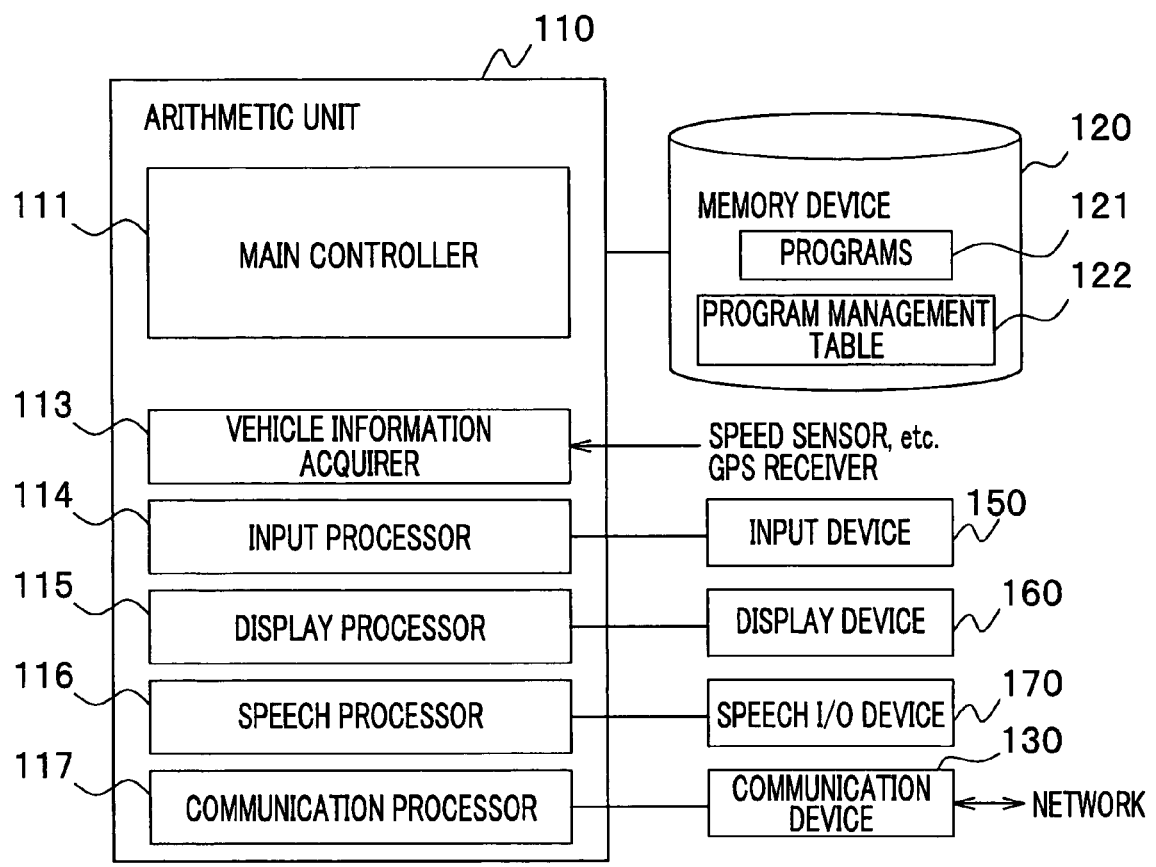
FIG. 2 is a schematic diagram of an in-car navigation apparatus.

FIG. 2 is a schematic diagram of the in-car navigation apparatus 100.

The in-car navigation apparatus 100 includes an arithmetic unit 110 including a CPU, etc., an arithmetic unit 110 including a CPU, etc., a memory device 120 including memories and HDD, etc., an input device 150 including a remote controller, etc., a display device 160 including a crystal display, etc., a speech I/O device 170 and a communication device 130. The Web server 300 may also be connected to the networks 5 via a cellular phone.

The communication device 130 may be implemented by any device that can input or output data to an external device of the in-car navigation apparatus 100. Therefore, a data reading/writing device for reading/writing data to a storage medium (not shown) may be equipped to the in-car navigation apparatus 100, as a substitution for or an addition to the communication device 130. The data reading/writing device for reading/writing data to a storage medium may be implemented by use of an I/O device for reading/writing data to an external storage medium such as a memory card and memory chips including non-volatile semiconductor memories. If an external storage medium such as a memory card and memory chips including non-volatile semiconductor memories is used as a storage medium, programs to be installed and a program lists thereof that have been received from the program-delivery center 200 or the Web server 300 are previously stored on the external storage medium by using a information terminal device such as a personal computer that is connected to the networks 5 through wired communication or radio communication via a base transceiver station 400. The external storage medium is mounted to the above-mentioned data reading/writing device, so that the programs and the program list thereof that have been stored on the external storage medium can be read out.

On the memory device 120, programs (not shown) are stored, which execute various operations of the in-car navigation apparatus 100. The memory device 120 includes area for storing programs 121 that have been downloaded and installed from the program-delivery center 200 or the Web server 300. The memory device 120 further includes area for storing a table for managing the installed programs 121 (program management table 122).

FIG. 3 shows the program management table 122.

As shown in FIG. 3, on the program management table 122, each record includes fields for a program name 1221, a file name 1222, authentication information 1223 and warning information 1224 of the program. Each field of the authentication information 1223 includes either information of "authorized", "unauthorized" and under "monitoring". The field of the warning information 1224 includes a "date" when the warning information was displayed and a "reason" for displaying the warning.

With reference to FIG. 2 again, the arithmetic unit 110 serves as a main unit for performing various processes on the in-car navigation apparatus 100. The arithmetic unit 110 includes a main controller 111, a vehicle information acquirer 113, an input processor 114, a display processor 115, a speech processor 116 and a communication processor 117.

The main controller 111 controls various processes of the arithmetic unit 110. For example, when receiving a route search request, the main controller 111 sets a departure of place and a destination so as to search an appropriate route by using the Dijkstra method and the like. Based on the above-searched route, the main controller 111 displays navigation information on the display device 160 to provide the user with a route-navigating operation.

The vehicle information acquirer. 113 receives data outputted from a speed sensor or a GPS receiver which are mounted to the vehicle. The vehicle information acquirer 113 also receives information on various operations of the vehicle via a vehicle LAN, and transmits it to the main controller 111.

The input processor 114 receives an instruction inputted by a user via the input device 150, and transmits the received instruction to the main controller 111.

The display processor 115 generates rendition commands for the display device 160 and transmits them thereto.

The speech processor 116 synthesizes sound data to be outputted to a speech I/O device 170, and transmits and outputs the data thereto.

The communication processor 117 provides communication between the in-car navigation apparatus 100 and the program-delivery center 200 or the Web server 300, via the communication device 130.

As described above, if the in-car navigation apparatus 100 is equipped with a data reading/writing device for reading/writing data to a storage medium as a substitution for or an addition to the communication device 130, the in-car navigation apparatus 100 is also equipped with a data I/O processor (not shown) for inputting and outputting data to the external storage medium through this data reading/writing device.

Each functional subunit from 111 to 117 of the arithmetic unit 110 can be activated by executing the programs that are loaded on the memory device 120 thereof.

(Operations)

Explanations will be provided on operation of the in-car navigation apparatus 100 as follows.

Figure 4:
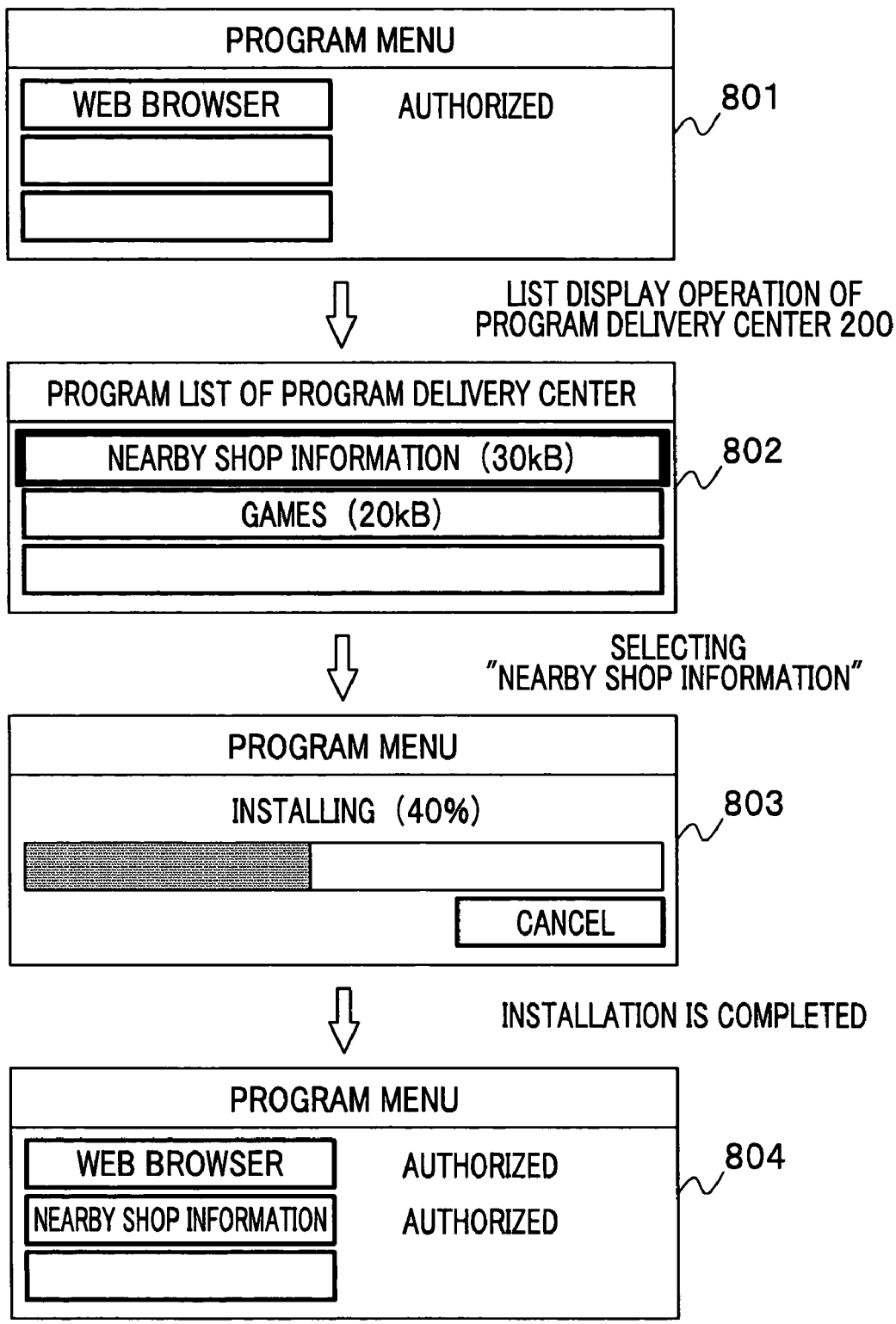
FIG. 4 is a display screen transition diagram when downloading program.

An explanation will be given on a case in which the program P1 authorized with an electronic signature is downloaded from the program-delivery center 200. FIG. 4 is a display screen transition diagram of the display device 160 when downloading the program P1.

The main controller 111 receives a download request for the program P1, from a user via the input device 150. The main controller 111 extracts the program names 1121 and authentication information 1223 from the program management table 122 stored on the memory device 120. These extracted data is displayed on the display device 160 in a list form. As illustrated in a display screen 801 of the display device 160, a name and authentication information of the already installed program P1 are displayed.

Next, the main controller 111 receives a display request for the program list stored on the program-delivery center 200, from the user via the input device 150. Then, the main controller 111 accesses to the program-delivery center 200 via the communication device 130 and acquires the program list stored on the program-delivery center 200, and then displays the acquired list as illustrated in a display screen 802 of the display device 160.

Following the above steps, the main controller 111 receives a specification of which program should be downloaded, from the user via the input device 150. Then, the main controller 111 transmits the download request for the specified program to the program-delivery center 200. In accordance with this request, the program-delivery center 200 downloads the specified program onto the in-car navigation apparatus 100.

If the in-car navigation apparatus 100 is equipped with a data reading/writing device for reading/writing data to a storage medium as a substitution for or an addition to the communication device 130, the main controller 111 first receives a specification of a destination to acquire the program to be downloaded, from the user via the input device 150, following receiving the download request for the program. At this time, if the program P1 is specified to be acquired via communication, the main controller 111 accesses to the program-delivery center 200 via the communication device 130 to download the program, as described above. If the external storage medium is specified as a destination to acquire the program, the main controller 111 displays information on the programs that have already been installed in correspondence to the program management table 122 on the memory device 120, and then validates whether the external storage medium is mounted to the in-car navigation apparatus 100 by using the data I/O processor through the data reading/writing device. If the external storage medium is not mounted, the main controller 111 displays an alert screen on the display device 160. If the external storage medium is mounted, the main controller 111 reads out the program list that is previously stored on the external storage medium and controls the display device 160 to display the list.

Then, the main controller 111 receives the specification of the program to be read out from the external storage medium, from the user via the input device 150. The main controller 111 sends an instruction to the I/O data processor to read the specified program so that the data reading/writing device reads out the specified program from the external storage medium, and then sends the program to the in-car navigation apparatus 100.

Completing downloading the program, the main controller 111 installs the downloaded program in accordance with predetermined install program. The main controller 111 may display an installing status of the program, as illustrated in a display screen 803.

The main controller 111 adds a new record to the program management table 122, in which a program name 1221, a file name 1222 and authentication information 1223 indicating as "authorized" of the installed program are registered.

The main controller 111 may also be configured in such a manner that the controller 111 determines whether or not an electronic signature is attached to the downloaded program, and if the electronic signature is attacked thereto, the main controller 111 registers a status "authorized" into the authentication information 1223 thereof. Otherwise, the main controller 111 may register a status under "monitoring" into the authentication information 1223 thereof.

Next, the main controller 111 again displays the program list as illustrated in a display screen 804 of the display device 160, in correspondence to the updated program management table 122.

An explanation will be provided on a case in which program P2 is downloaded from the Web server 300. The program P2 to be downloaded from the Web server 300 is an unauthorized program with no electronic signature.

Figure 5:
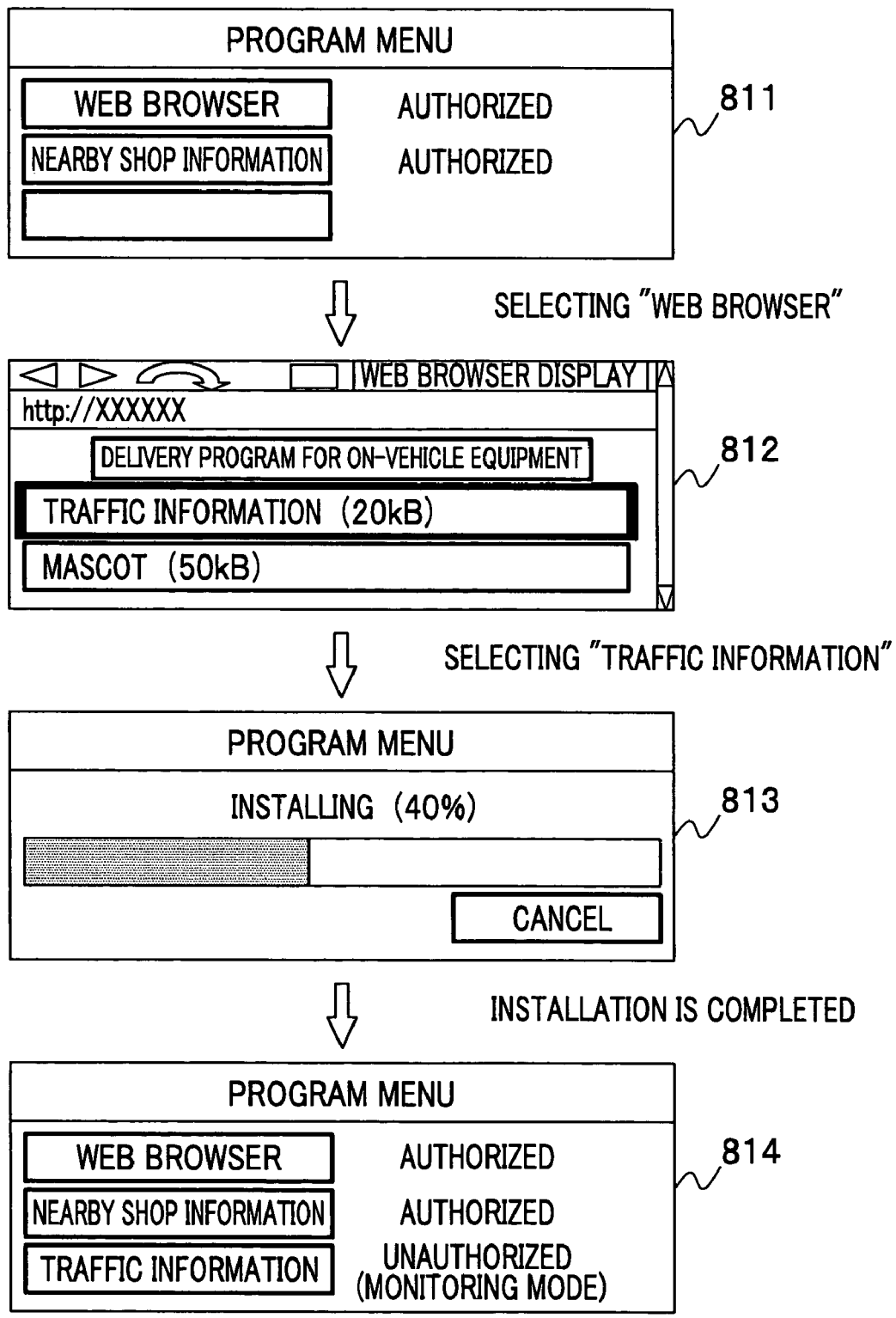
FIG. 5 is another display screen transition diagram when downloading program.

FIG. 5 is a display screen transition diagram of the display device 160 when the program P2 is downloaded.

The main controller 111 receives a download request for the program P2, from the user via the input device 150. Next, the main controller 111 extracts program names 1221 and authentication information 1223 from the program management table 122 that is stored on the memory device 120. Then, the main controller 111 displays the information in a list form on the display device 160. In this way, the names and authentication information of already installed programs are displayed, as illustrated in a display screen 811.

Note that it is assumed that Web browser has already been installed, in this case.

The main controller 111 receives a start request for the Web browser, and then the main controller 111 accesses to the Web server 300 through the Web browser. Next, the main controller 111 acquires a program list stored on the Web server 300, and then displays the acquired list as illustrated in a display screen 812.

The main controller 111 receives a specification of which program should be downloaded, from the user via the input device 150, and then sends a download request of the specified program to the Web server 300. In accordance with the download request, the Web server 300 downloads the specified program to the in-car navigation apparatus 100.

The main controller 111 installs the program, following downloading the program. The main controller 111 may display an installing status of the program, as illustrated in a display screen 813.

The main controller 111 adds a new record to the program management table 122, in which a program name 1221, a file name 1222 and authentication information 1223 indicated as under "monitoring" of the installed program are registered.

Then, the main controller 111 again displays the program list as illustrated in a display screen 814 of the display device 160, in correspondence to the updated program management table 122.

Figure 6:
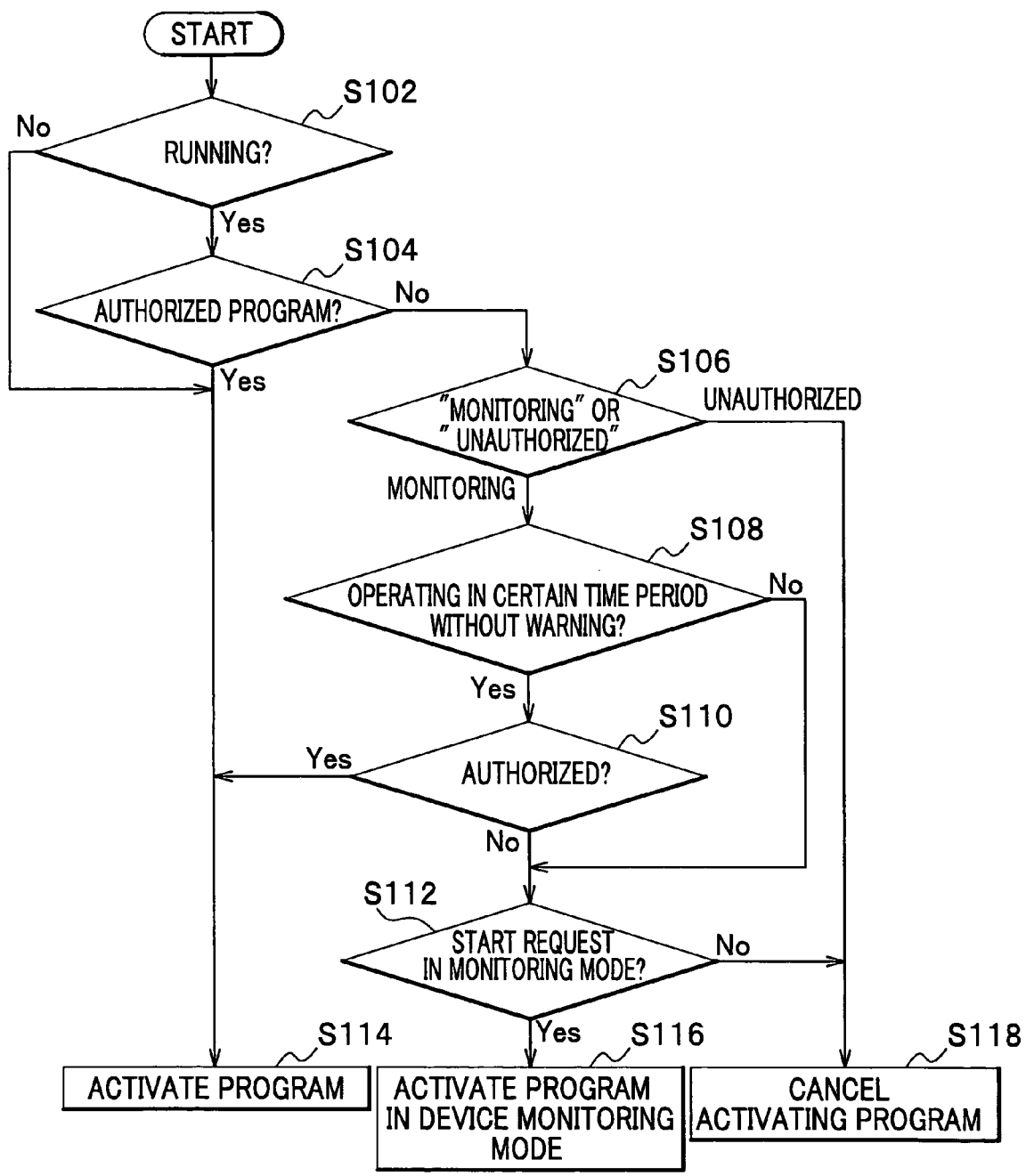
FIG. 6 is a flow chart when receiving an execution request for program.

Next, an explanation will be provided on a case in which a start request of the installed program is received. FIG. 6 is a flow chart in this case. The flow starts when the user specifies one of the programs that have been installed and makes a start request therefor.

The main controller 111 determines whether or not the vehicle is running through the vehicle information acquirer 113 (S102). For example, the determination is made based on a driving speed obtained from a speed sensor or on a current traveling amount obtained from a GPS receiver, and if the driving speed is greater than a predetermined speed (e.g. 5 km/h), it is determined that the vehicle is running.

If it is determined that the vehicle is not running (No at S102), the main controller 111 activates the specific program (S114). If it is determined that the vehicle is running (Yes at S102), the main controller 111 determines whether the specified program is "authorized" or not, in correspondence to the authentication information 1223 on the program management table 122. If the determination is "authorized" (Yes at S104), the main controller 111 activates the specified program (S114).

Figure 7:
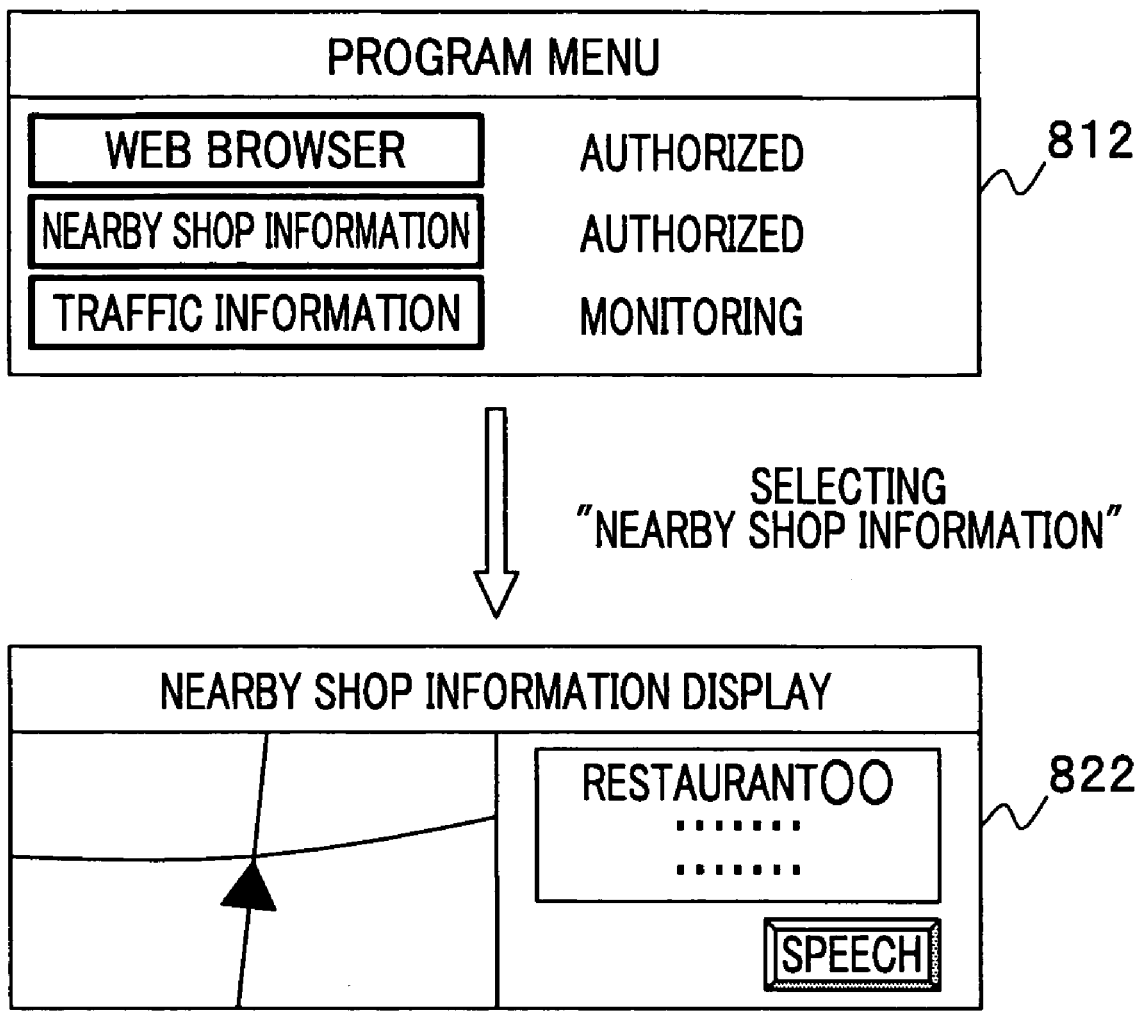
FIG. 7 is a display screen transition diagram when executing "authorized" program.

FIG. 7 is a display screen transition diagram when the specified program is activated.

As shown in FIG. 7, the main controller 111 displays the program list of the programs that have been installed. The main controller 111 receives a specification of which program of the list should be activated, and then executes the specified program, from the user via the input device 150.

As shown in FIG. 7, the program "nearby shop information" is "authorized". A display screen 822 shows a status when the program is selected and activated.

With reference to FIG. 6 again, if the specified program is not "authorized" (No at S104), the main controller 111 determines whether the program is to be under "monitoring" or "unauthorized" in correspondence to the authentication information 1223. If the program is under "monitoring", the main controller 111 acquires warning information 1224 for the specified program. Then, the main controller 111 determines whether any "warning" has been displayed in a predetermined time period (e.g. for two weeks since the program has been installed) in corresponding to the warning information 1224. Specifically, the main controller 111 determines that "warning" has been displayed if any date when the "warning" was displayed is stored in the warning information 1224. On the other hand, if any date when "warning" was displayed is not stored in the warning information 1224, the main controller 111 determines that any "warning" has not been displayed (S108).

If any "warning" has not been displayed in the predetermined time period (Yes at S108), the main controller 111 receives a selection of whether the specified program should be authorized or not, from the user via the input device 150 (S110). If it is selected that the program should be authorized (Yes at S110), the main controller 111 updates the authentication information 1223 on the program management table 122 for the specified program to "authorized". In accordance with the updated program management table 122, the program list is displayed, and then the specified program is activated (S114).

Figure 8:
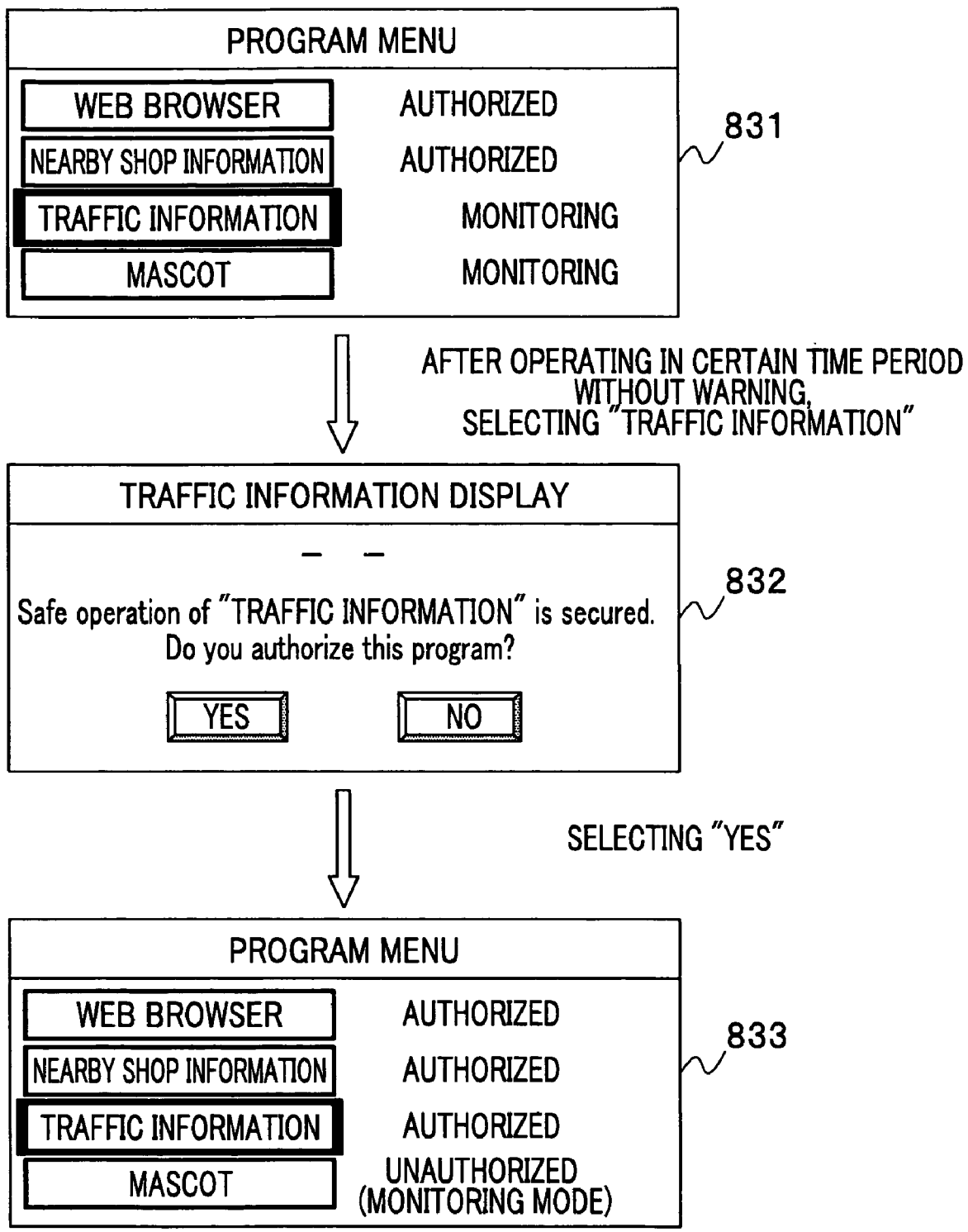
FIG. 8 is a display screen transition diagram when executing program under "monitoring" (authentication selection).

FIG. 8 is a display screen transition diagram of whether the specified program is selected to be authorized or not. As shown in FIG. 8, the main controller 111 displays the list of the installed programs. The main controller 111 receives a selection for the program, from the user via the input device 150, and then executes the specified program. Now, assumed that a program "traffic information" is selected.

In FIG. 8, the program "traffic information" is under "monitoring". The main controller 111 displays a display screen 832 to select whether the program "traffic information" should be authorized or not. If the program "traffic information" is selected to be authorized, the main controller 111 updates the authentication information 1223 on the program management table 122 for the program "traffic information" to "authorized". Then, the program list on the updated program management table 122 is displayed, as illustrated in a display screen 833, where the program "traffic information" has been "authorized".

With reference to FIG. 6 again, even though any warning has been displayed (No at S108) or no warning has been displayed (Yes at S108) in the predetermined time period, if no authentication for the specified program is received from the user (No at S110), the main controller 111 receives a selection of whether or not a monitoring mode should be activated on the specific program (S112).

If the monitoring mode is selected to be activated (Yes at S112), the main controller 111 activates the specific program in the device monitoring mode (described later) (S116).

Figure 9:
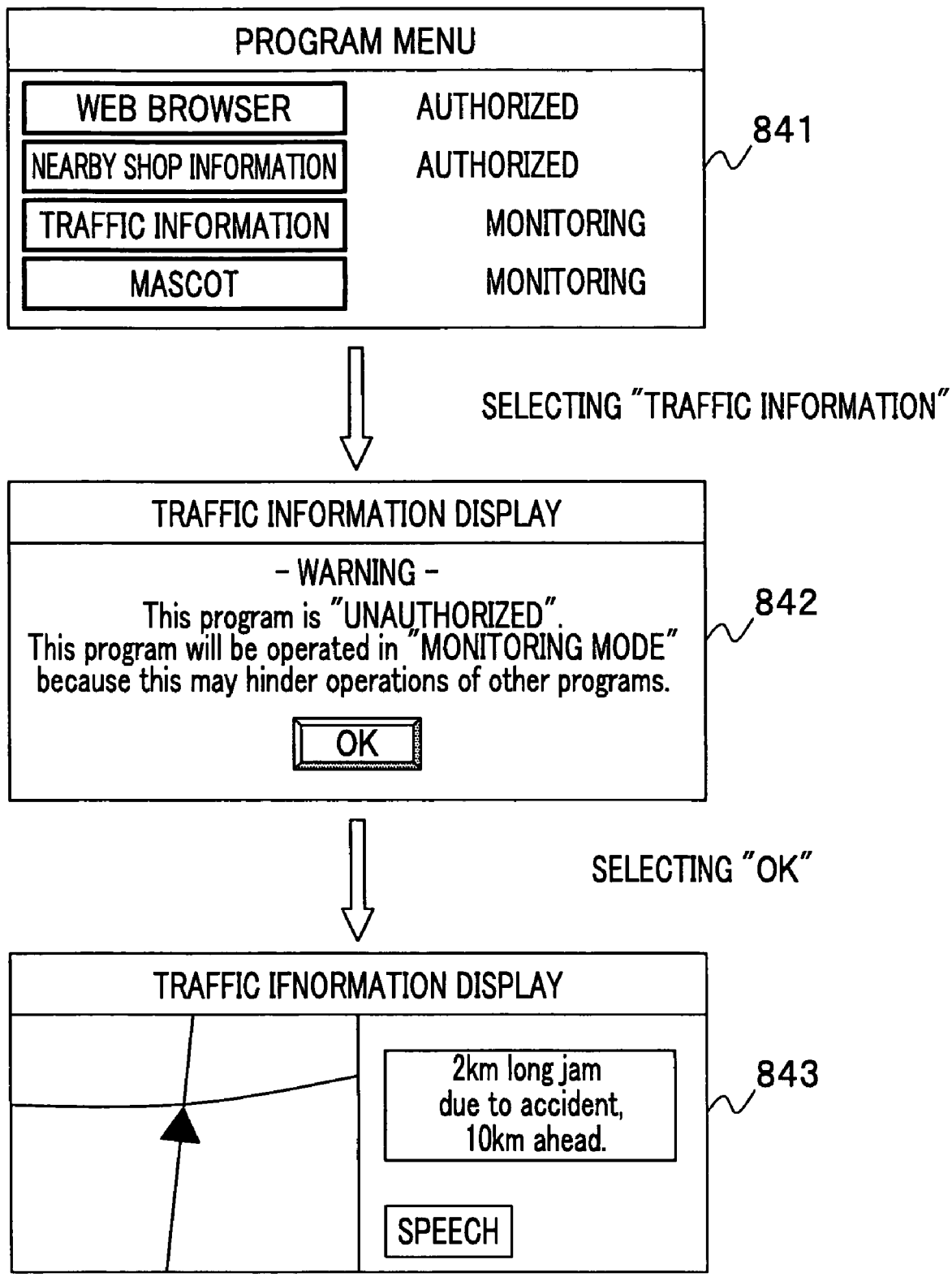
FIG. 9 is a display screen transition diagram when executing program under "monitoring" (device monitoring mode).

FIG. 9 is a display screen transition diagram of whether the specific program should be under monitoring or not. The main controller 111 displays the program list of programs that have been installed, as illustrated in a display screen 841. The main controller 111 receives, from the user via the input device 150, a specification of which program should be activated, and then executes the specified program.

In FIG. 9, the program "traffic information" is under "monitoring". Now assumed that the program "traffic information" had any warning in a predetermined time period, and the user selects the program "traffic information".

In an above case, at the step S112, a display screen 842 is displayed, showing whether the specific program is activated in the device monitoring mode or not. If the program is selected to be activated in the device monitoring mode, the program is activated as illustrated in a display screen 843.

With reference to FIG. 6 again, if the specified program is "unauthorized" ("unauthorized" at S106), or if the specified program is not requested to be activated in the device monitoring mode (No at S112), the main controller 111 cancels activating the program (S118).

Next, a specific explanation will be provided on a case in which the program is activated in the device monitoring mode at S116.

Figure 10:
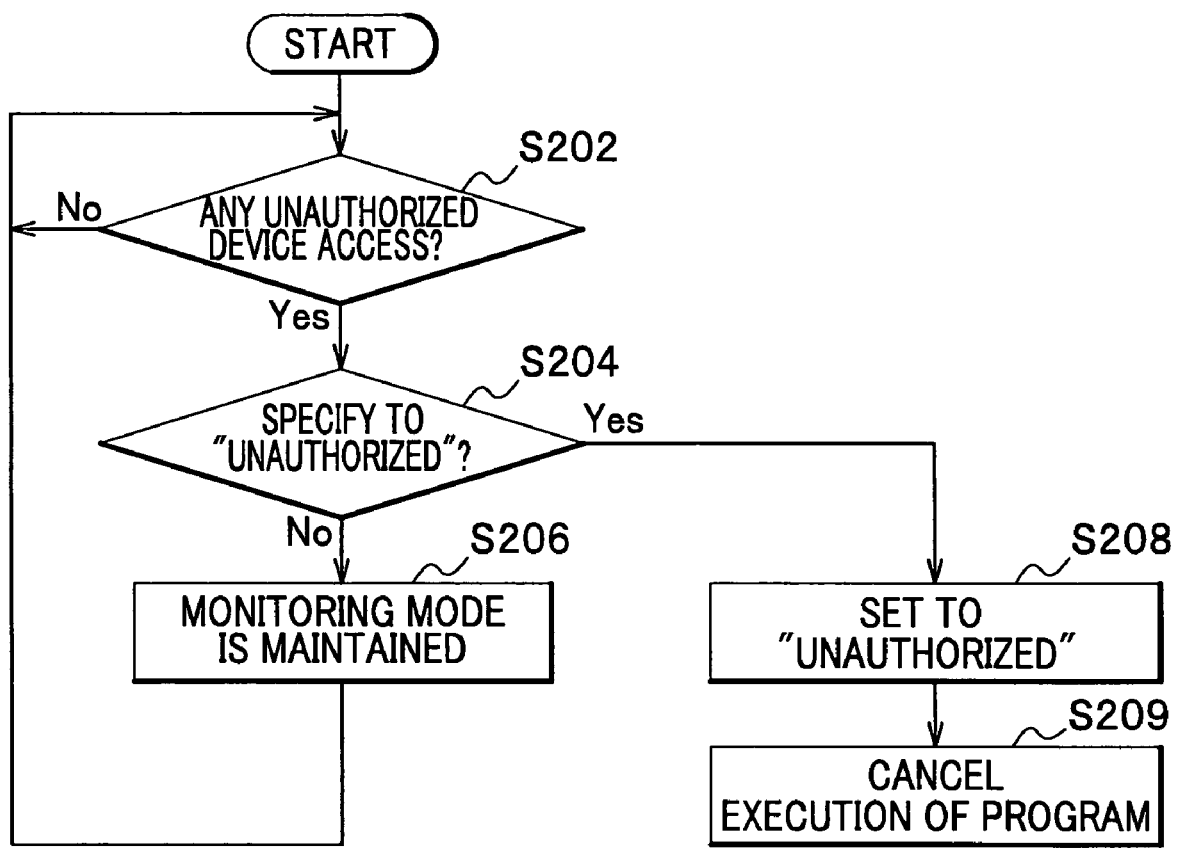
FIG. 10 is a flow chart of a process at S116 of FIG. 6.

FIG. 10 is a process flow chart while the program is executed in the device monitoring mode.

The main controller 111 monitors whether there is any unauthorized device access or not during executing the program.

The main controller 111 determines that there is an unauthorized device access, for example, when either of the following cases occurs:

(1) Occupation of Receipt of Input from Input device: receiving input signals transmitted from the input device 150 is limited by the specified program.
(2) Occupation of Display Screen: display operation of another program is limited by the specified program.
(3) Occupation of Receipt of Speech Input: receiving input signals transmitted from the speech I/O device 170 is limited by the specified program.
(4) Speech Output with a Larger Volume: speech sound is output from the speech I/O device 170 at a volume greater than a predetermined volume by the specified program.
(5) Data Communication to External: communication is carried out to the external through the communication device 130 (such as a cellular phone) by the specified program.
(6) Acquisition/Manipulation of Vehicle Information (vehicle location, etc.): information on a current location of the vehicle is manipulated by the specified program.
(7) Acquisition of Destination Information: point information set as a navigation destination is transmitted to the external by the specified program.
(8) Manipulation of navigation Rout Information: a navigation route is manipulated by the specified program.
(9) Occupation of Memories: more memory area is used than a predetermined range by the specified program.
(10) Playing Dynamic Images During Driving: dynamic images is played during vehicle driving.

If the main controller 111 determines that there is any authorized device access (Yes at S202), the main controller 111 "warns", displaying detail information about detected unauthorized device access. The main controller 111 also registers a date when the warning is displayed, and a reason for displaying the warning to the warning information 1224 on the program management table 122. Moreover, the main controller 111 receives a selection of whether the program should be "unauthorized" or not (S204).

If receiving a selection of "unauthorized" for the program from the user via the input device 150 (Yes at S204), the main controller 111 updates the authentication information 1223 on the program management table 122 to "unauthorized" and completes the process, which means that the main controller 111 cancels executing the specified program (S209).

If the main controller 111 does not receive a selection to be "unauthorized" for the program, because, for example, a cancel button has been clicked (No at S204), the main controller 111 resumes executing the program in the device monitoring mode (S206).

Figure 11:
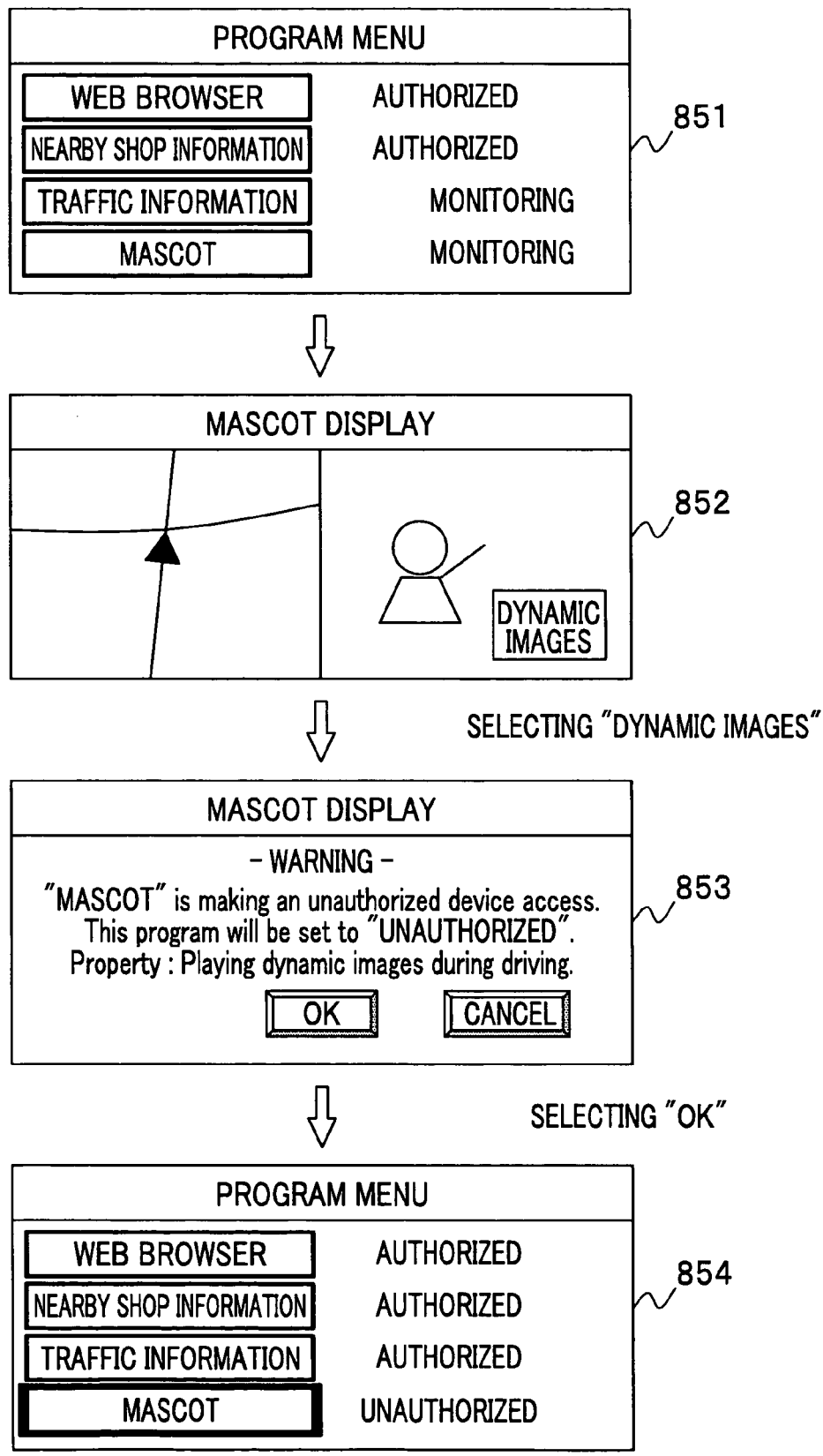
FIG. 11 is a display screen transition diagram when executing program under "monitoring" (unauthorized).

FIG. 11 is a display screen transition diagram when the specified program is executed in the device monitoring mode. The program "Mascot" is set to be under "monitoring" in the authentication information 1223 on the program management table 122, as shown in FIG. 11.

A display screen 852 shows a status when the program is activated in the device monitoring mode.

During executing the program, if the program "MASCOT" makes an unauthorized device access (e.g. playing dynamic images during driving), information that an unauthorized device access has been made is displayed, as shown in a display screen 853, and a selection screen is displayed, asking whether or not the active program "MASCOT" should be "unauthorized" or not. If "unauthorized" is selected, the main controller 111 updates the authentication information 1223 for the program "Mascot" to "unauthorized". Then, the program list is displayed in correspondence to the updated program management table 122, as shown in a display screen 854. A message that the program "Mascot" is "unauthorized" is shown in this display screen 854.

The explanations have been provided on the embodiment according to the present invention, as set forth above.

The above mentioned embodiment of the present invention does not indiscriminately prohibit executing additionally installed programs during vehicle driving, whereby more comfort and convenience can be secured. In addition, according to the embodiment of the present invention, all the active programs are authorized either by certificate authorities or a user, so that those active programs never hinder other operations of the in-car navigation apparatus.

The embodiments according to the present invention have been explained as aforementioned. However, the embodiments of the present invention are not limited to those explanations, and those skilled in the art ascertain the essential characteristics of the present invention and can make the various modifications and variations to the present invention to adapt it to various usages and conditions without departing from the spirit and scope of the claims.

What is claimed is:

1. A navigation apparatus comprising:
a receiving section of an electronic processor of the navigation apparatus for receiving program via a communication unit;
a driving determining section of the electronic processor for determining whether a vehicle equipped with the navigation apparatus is running or not if receiving a start request for the program
an execution control section of the electronic processor for activating the program if it is determined that the vehicle is running by the driving determining section and also if the program received by the receiving section is authorized, and a monitoring section for monitoring whether or not there is any unauthorized device access during executing the program received by the receiving section, wherein the executing control section cancels executing the program if it is determined that the vehicle is running by the driving determining section and also if the program received by the receiving section is not authorized, and if it is determined that there is any unauthorized device access during execution of the program by the monitoring section.

2. The navigation apparatus according to claim 1, wherein the execution control section determines that the program is authorized if the program is attached with information indicating being authorized, and determines that the program is not authorized if the program is attached with no information indicating being authorized.

3. The navigation apparatus according to claim 1 further comprising a displaying section for displaying information of whether the program is authorized or not.

4. A navigation apparatus comprising:

a receiving section of an electronic processor of the navigation apparatus for receiving program via a communication unit;

a monitoring section of the electronic processor for monitoring whether or not there is any predetermined unauthorized device access during executing the program received by the receiving section; and an execution control section of the electronic processor for canceling executing the program if it is determined that there is any predetermined unauthorized device access by the monitoring section.

5. A navigation apparatus comprising:

a receiving section of an electronic processor of the navigation apparatus for receiving program via a communication unit;

a monitoring section of the electronic processor for monitoring whether or not there is any predetermined unauthorized device access during executing the program received by the receiving section; and an authorizing section of the electronic processor for authorizing the program if it is determined that there has been no predetermined unauthorized device access in a predetermined time period by the monitoring section.

6. The navigation apparatus according to claim 5, wherein the unauthorized device access includes at least one of:

occupation of receipt of input from an input device,
occupation of a display screen,
occupation of receipt of speech input,
speech output with a large volume,
data communication to external,
acquisition/manipulation of at least one of vehicle information and vehicle location,
acquisition of destination information,
manipulation of route information, and
occupation of memory.

7. A navigation apparatus comprising:

a downloading section of an electronic processor of the navigation apparatus for downloading program via a communication unit;

a driving determining section of the electronic processor for determining whether or not a vehicle equipped with the navigation apparatus is running if an execution request for the program is received;

an electronic signature determining section of the electronic processor for determining whether or not the program is attached with an electronic signature if it is determined that the vehicle is running by the driving determining section;

a program activating section of the electronic processor for activating the program if it is determined that the program is attached with the electronic signature by the electronic signature determining section;

a device access determining section of the electronic processor for activating the program and determining whether or not there is any predetermined unauthorized device access during executing the program if it is determined that the program is attached with no electronic signature;

a selection receiving section of the electronic processor for outputting warning and receiving a selection of whether execution of the program should be canceled or not if there is any predetermined unauthorized device access; and an execution selecting section of the electronic processor for canceling the execution of the program if it is selected that the execution of the program should be canceled and if it is determined that there is any predetermined unauthorized device access during execution of the program, or maintaining the execution of the program if it is selected that the execution of the program should not be canceled.

8. The navigation apparatus according to claim 7, wherein the unauthorized device access includes at least one of:

occupation of receipt of input from an input unit,
occupation of a display screen,
occupation of receipt of a speech input,
speech output with a large volume,
data communication to external,
acquisition/manipulation of at least one of vehicle information and vehicle location,
acquisition of destination information,
manipulation of route information, and
occupation of memory.

9. A processing method carried out in an electronic processor of a navigation apparatus comprising:

a receiving step of receiving program via a communication unit of the electronic processor;

a driving determining step of determining whether or not a vehicle equipped with the navigation apparatus is running if a start request for the program is received in the communication unit;

an execution control step of activating the program if it is determined that the vehicle is running at the driving determining step and also if the program received at the receiving step is authorized in the electronic processor; and a monitoring step for monitoring whether or not there is any unauthorized device access during the executing of the program received at the receiving step, wherein the execution control step further cancels executing the program if it is determined that the vehicle is running at the driving determining step and also if the program received at the receiving step is not authorized in the electronic processor, and if it is determined that there is any unauthorized device access during execution of the program at the monitoring step.

10. A processing method carried out in an electronic processor of a navigation apparatus comprising:

a receiving step of receiving program via a communication unit of the electronic processor;

a monitoring step of determining whether or not there is any predetermined unauthorized device access during executing the program received at the receiving step in the communication unit; and an execution control step of canceling executing the program if it is determined in the electronic processor that there is any predetermined unauthorized device access at the monitoring step.

11. A processing method carried out in an electronic processor of a navigation apparatus comprising:

a downloading step of downloading program via a communication unit of the electronic processor;

a monitoring step of determining whether or not there is any predetermined unauthorized device access during executing the program received at the receiving step in the communication unit; and an authorizing step of authorizing the program if it is determined that there has been no predetermined unauthorized device access in a predetermined time period at the monitoring step in the electronic processor.

12. A processing method carried out in an electronic processor of a navigation apparatus comprising:

a downloading step of downloading program via a communication unit of the electronic processor;

a driving determining step of determining whether or not a vehicle equipped with the navigation apparatus is running if an execution request for the program is received in the communication unit;

a signature determining step of determining whether or not the program is attached with an electronic signature if it is determined that the vehicle is running at the driving determining step in the electronic processor;

an activating step of activating the program in the electronic processor if it is determined that the program is attached with an electronic signature;

a device access determining step of activating the program in the electronic processor and determining whether or not there is any predetermined unauthorized device access during executing the program if it is determined that the program is attached with no electronic signature;

a selection receiving step in the electronic processor of outputting warning and receiving a selection of whether execution of the program should be canceled or not if there is any predetermined unauthorized device access; and an execution selecting step in the electronic processor of canceling the execution of the program if it is selected that the execution of the program should be canceled and if it is determined that there is any predetermined unauthorized device access during execution of the program, or maintaining the execution of the program if it is selected that the execution of the program should not be canceled.

* * * * *

UNITED STATES PATENT AND TRADEMARK OFFICE
CERTIFICATE OF CORRECTION

PATENT NO. : 7,610,144 B2 Page 1 of 1
APPLICATION NO. : 11/396631
DATED : October 27, 2009
INVENTOR(S) : Tanaka et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 717 days.

Signed and Sealed this

Twelfth Day of October, 2010

David J. Kappos
*Director of the United States Patent and Trademark Office*